United States Patent
Graveson et al.

(10) Patent No.: US 9,371,401 B2
(45) Date of Patent: Jun. 21, 2016

(54) LOW ENERGY METHOD FOR THE PREPARATION OF NON-DERIVATIZED NANOCELLULOSE

(71) Applicant: SAPPI NETHERLANDS SERVICES B.V., Maastricht (NL)

(72) Inventors: Ian Graveson, Nuneaton (GB); Robert English, Chester (GB)

(73) Assignee: SAPPI Netherlands Services B.V., Maastricht (NL)

( * ) Notice: Subject to any disclaimer, the term of this patent is extended or adjusted under 35 U.S.C. 154(b) by 0 days.

(21) Appl. No.: 14/413,449

(22) PCT Filed: Jul. 12, 2013

(86) PCT No.: PCT/EP2013/064776
§ 371 (c)(1),
(2) Date: Jan. 8, 2015

(87) PCT Pub. No.: WO2014/009517
PCT Pub. Date: Jan. 16, 2014

(65) Prior Publication Data
US 2015/0158955 A1    Jun. 11, 2015

(30) Foreign Application Priority Data
Jul. 13, 2012 (EP) .................. 12176252

(51) Int. Cl.
*D21H 17/07* (2006.01)
*C08B 15/02* (2006.01)
*D21C 9/00* (2006.01)
(Continued)

(52) U.S. Cl.
CPC .............. *C08B 15/02* (2013.01); *D21C 9/004* (2013.01); *D21C 9/005* (2013.01); *D21C 9/007* (2013.01); *D21H 11/18* (2013.01); *D21H 17/07* (2013.01); *D21H 17/64* (2013.01); *D21H 17/66* (2013.01); *D21H 21/22* (2013.01)

(58) Field of Classification Search
USPC ........................................................ 162/76
See application file for complete search history.

(56) References Cited

U.S. PATENT DOCUMENTS 6,555,678 B1 *  4/2003  Allandrieu et al. ............. 536/57
2004/0137582 A1 *  7/2004  Dordick et al. ............... 435/101
(Continued)

FOREIGN PATENT DOCUMENTS

DE    195 43 310 A1    5/1997
EP    2 133 366 A1    12/2009
(Continued)

OTHER PUBLICATIONS

H.T. Lokhande: "Swelling behavior of cotton fibers in morpholine and piperidine", Journal of Applied Polymer Science, vol. 22, No. 5, May 1, 1978, pp. 1243-1253, XP055118176, ISSN:0021-8995, DOI: 10.1002/app. 1978.070220507.
(Continued)

Primary Examiner — Jacob Thomas Minskey
(74) Attorney, Agent, or Firm — Sughrue Mion, PLLC

(57) ABSTRACT

A low energy method for the preparation of nanocellulose using selected organic or inorganic swelling agents. The use of these swelling agents allows opening up the intercrystalline structure and partially the intracrystalline structure of cellulosic materials thereby achieving a reduction 5 in the energy required to subsequently process the resultant swollen cellulose material into nanocellulose.

5 Claims, 5 Drawing Sheets

Figure 1:
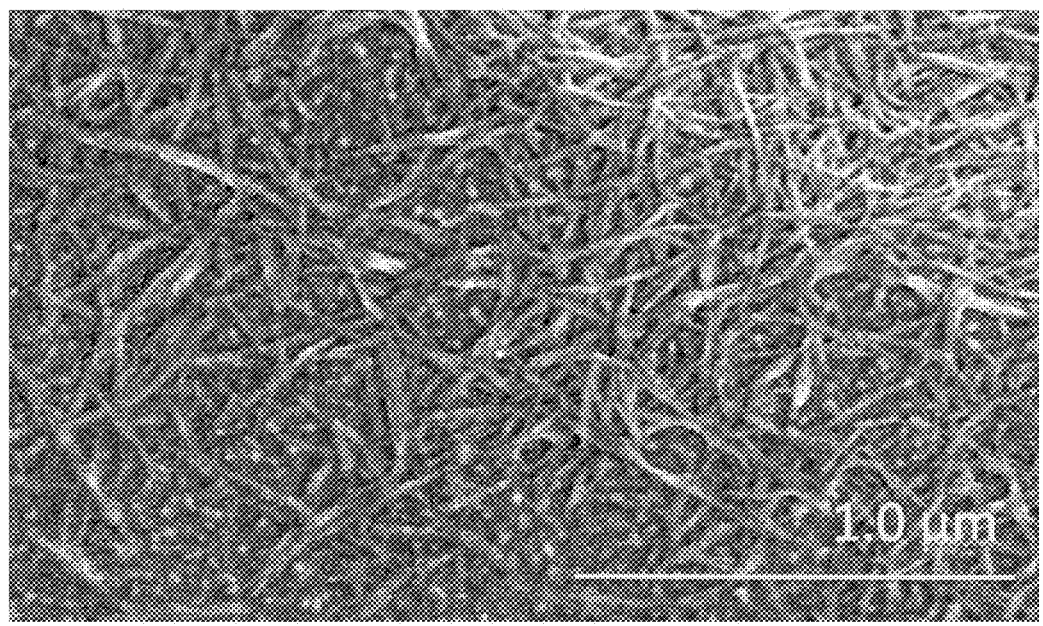
Figure 2A:
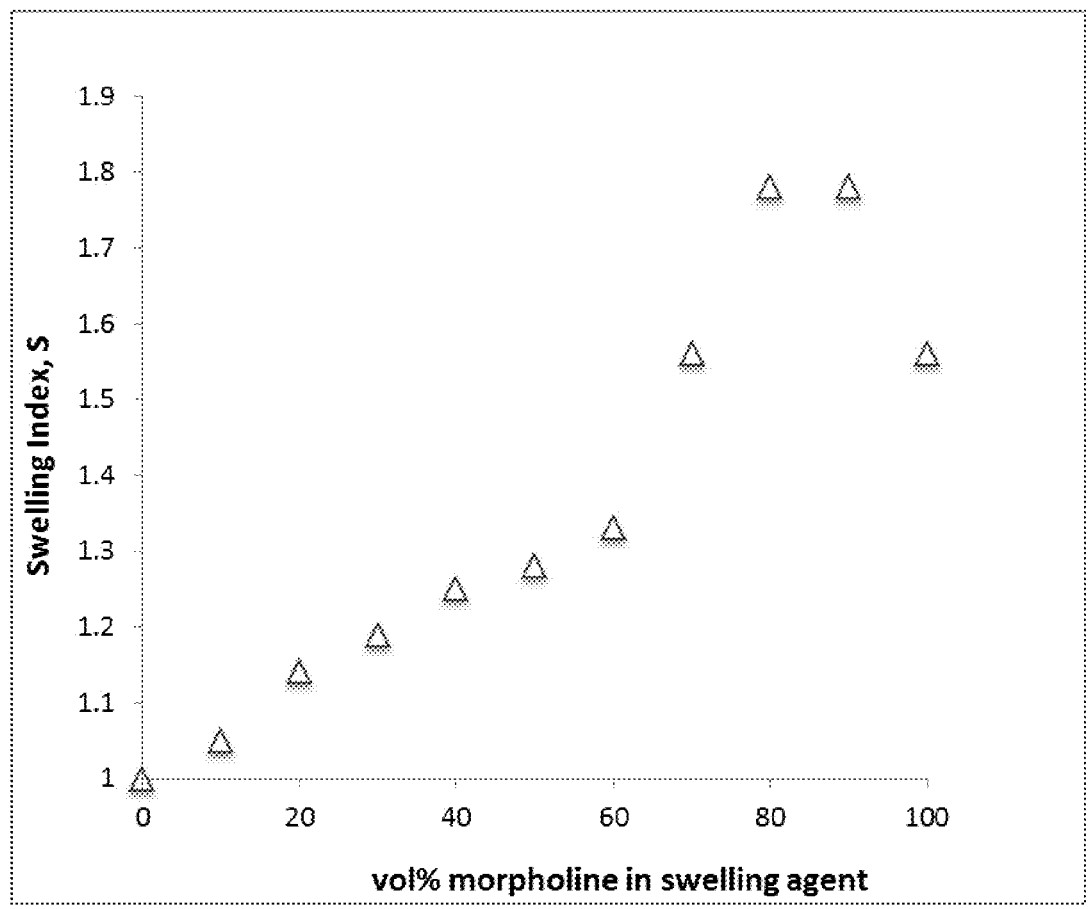
Figure 2B:
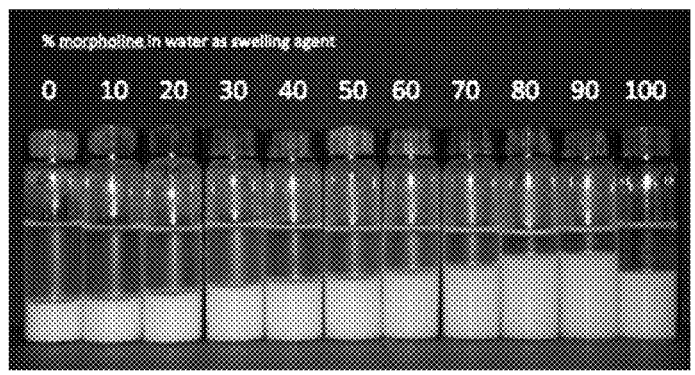
Figure 2C:
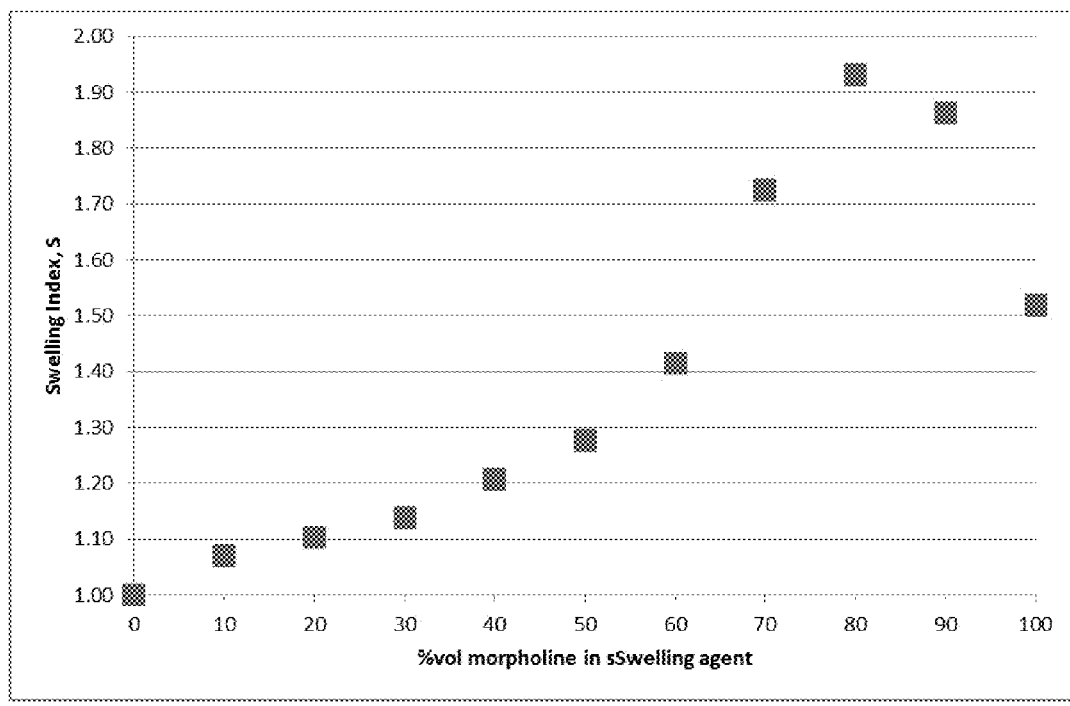
Figure 2D:
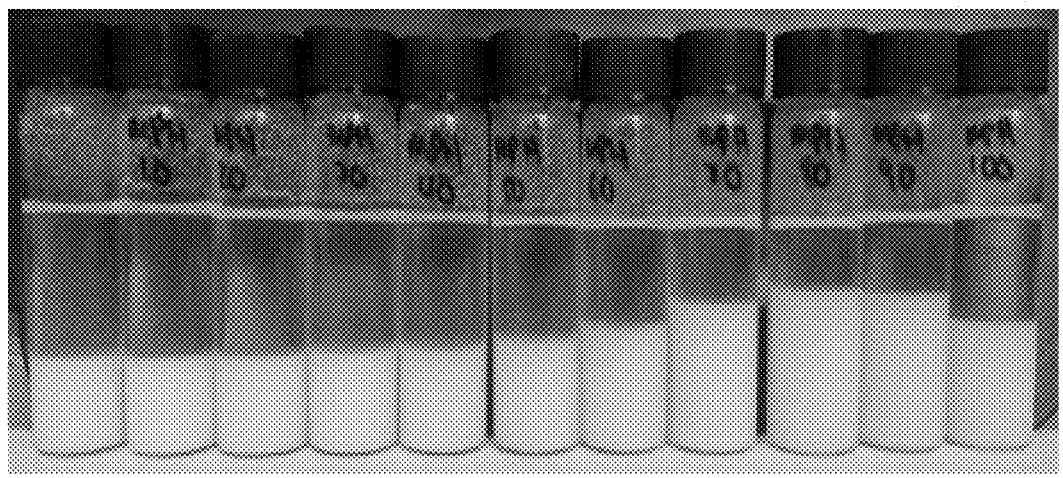

(51) Int. Cl.
*D21H 11/18* (2006.01)
*D21H 17/64* (2006.01)
*D21H 17/66* (2006.01)
*D21H 21/22* (2006.01)

(56) References Cited

U.S. PATENT DOCUMENTS

2011/0036522 A1 2/2011 Ankerfors et al.
2012/0043039 A1 2/2012 Paltakari et al.

FOREIGN PATENT DOCUMENTS

| EP | 2 236 545 A1 | 10/2010 |
|---|---|---|
| EP | 2 236 664 A1 | 10/2010 |
| EP | 2 386 682 A1 | 11/2011 |
| EP | 2 386 683 A1 | 11/2011 |
| EP | 2 532 410 A1 | 12/2012 |
| WO | 2009/063508 A2 | 5/2009 |
| WO | 2011/059386 A1 | 5/2011 |

OTHER PUBLICATIONS

Christian Eyholzer, "Dried Nanofibrillated Cellulose and its Bionanocomposites", Doctoral Thesis, Luleå University of Technology, Feb. 2011, pp. 1-206, XP 055048720.

T.T.T. Ho, et al., "Preparation and characterization of cationic nanofibrillated cellulose from etherification and high-shear disintegration process", Cellulose, 2011, p. 1391-1406, vol. 18, No. 6, XP 019974225.

Marta Hrabalova, et al., "Fibrillation of Flax and Wheat Straw Cellulose: Effects on Thermal, Morphological, and Viscoelastic Properties of Poly(Vinylalcohol)/Fibre Composites", BioResources, 2011, pp. 1631-1647, vol. 6, No. 2, XP 0550048728.

International Search Report of PCT/EP2013/064776, dated Oct. 17, 2013. [PCT/ISA/210].

\* cited by examiner

LOW ENERGY METHOD FOR THE PREPARATION OF NON-DERIVATIZED NANOCELLULOSE

CROSS REFERENCE TO RELATED APPLICATIONS

This application is a National Stage of International Application No. PCT/EP2013/064776 filed Jul. 12, 2013, claiming priority based on European Patent Application No. 12176252.0, filed Jul. 13, 2012, the contents of all of which are incorporated herein by reference in their entirety.

FIELD OF INVENTION

The present invention is directed towards a low energy method for the preparation of non-derivatized nanocellulose via a swollen intermediate.

BACKGROUND OF THE INVENTION

Conventional methods for creating nanofibrillated cellulose or nanocellulose are typically high energy processes or processes involving manipulating the cellulose to allow a reduction in energy consumption, such as partial derivatisation of the cellulose (see e.g. U.S. 2011/0036522), the use of an inorganic acid (see, e.g. Cellulose (1998) 5, 19-32), the use of alkaline processes or enzymes or a combination of these, or combining pulp with a cellulose derivative prior to processing to reduce energy requirements (see, e.g. U.S. 2012/0043039)

Applicants have now discovered a new low energy method for the preparation of non-derivatized nanocellulose via a swollen intermediate stage.

SUMMARY OF THE INVENTION

The present invention is directed towards a low energy method for the preparation of nanocellulose using selected organic or inorganic swelling agents. The use of these swelling agents allows opening up the intercrystalline structure and only partially but not fully opening up the intracrystalline structure of the cellulosic material thereby achieving a reduction in the energy required to subsequently process the resultant swollen cellulose material into nanocellulose.

The term "low energy method" or energy efficient method (or method of the invention) refers to a method which is characterized by a significantly reduced energy consumption of the mechanical processing devices applied compared to the known energy intensive prior art methods in this area of technology. Typically a low energy method suitable for the present invention is based on a mechanical comminution processing method, which typically requires less than 2000 kWh/t, preferably less than 1500 kWh/t and more preferably less than 500 kWh/t. Mechanical comminution processing methods include any effective mechanical comminution processing step which achieves a breaking up (or breakdown) into small particles (see also hereinafter).

The term "nanocellulose" as used herein encompasses the (interchangeably used) term "nanofibrillated cellulose" and refers to cellulose particles which are characterized by having an elongated form, having an aspect ratio of >1, and having an average length in the range of 15-900 nm, preferably in the range of 50-700 nm, more preferably 70-700 nm. The average thickness is preferably in the range of 3-200 nm, preferably in the range of 5-100 nm, more preferably in the range of 5-30 nm (for example, see FIG. 1(A).

The term "cellulosic material" as used herein includes but is not limited to the following type: microcrystalline cellulose, microbial cellulose, cellulose derived from marine or other invertebrates, mechanically generated wood pulp, chemical (dissolving) pulp, native biomass (in the form of plant fibres, stems or husks) and cellulosic man-made fibres such as tyre cord and other cellulose II sources such as mercerised cellulose. The cellulosic material may further be chemically derivatized by for example carboxylation, oxidation, sulphation or esterification.

Preferred cellulose sources are derived primarily from wood pulp and other cellulosic biomass fibres and microcrystalline cellulose, as for example Avicel PH-101, from FMC Corporation and also textile or technical textile fibres, for example as supplied by Cordenka GmbH under the trade name of Cordenka 700 (Super 3) can be used as a starting source of cellulosic material. Preferred sources of wood pulp include ground wood fibres, recycled or secondary wood pulp fibres, bleached and unbleached wood fibres. Both softwoods and hardwoods can be utilised. In addition suitable biomass materials such as bagasse and bamboo based cellulose can be utilised.

The term "swelling agent" is defined as being an agent that can disrupt either the intercrystalline bonding or which can disrupt both the intercrystalline and partially (i.e. not fully) the intracrystalline bonding normally present in cellulosic material.

Agents that will only disrupt intercrystalline bonding (and at most will minimally affect intracrystalline structure), will only lead to swelling independent of the reaction conditions used. Such agents will never lead to full solvation (which is a result of significant or full disruption of intracrystalline bonding). The extent of swelling is dependent on the interaction conditions.

Agents that are able to disrupt both intercrystalline bonding and intracrystalline bonding may lead to either swelling (at most partial but not full disruption of intracrystalline bonding) or solvation (full disruption of of intracrystalline bonding) depending on the reaction conditions. Thus, the choice of reaction conditions will determine whether swelling or solvation is obtained. For the present invention, suitable reaction conditions, e.g. concentration, temperature, reaction time have to be chosen for obtaining swelling only (i.e. either achieving disruption of the intercrystalline bonding only or achieving disruption of the intercrystalline bonding and only partial (but not full) disruption of the intracrystalline bonding), but preventing complete solvation. For use in the present invention full disruption of intracrystalline bonding is not desired and has to be prevented.

A suitable swelling agent is an organic or inorganic swelling agent or a mixture thereof (in pure form or a solution thereof). It is understood that a swelling agent may be a solid or a liquid. A solid swelling agent may be dissolved or suspended in one or more suitable solvents, a liquid swelling agent may be used in pure form or further diluted with one or more suitable solvents to form a swelling agent solution. Thus the term "swelling agent" includes all of the above forms (pure and in solution).

A typical inorganic swelling agent includes inorganic bases such as an inorganic halide, which is an inorganic metal halide or inorganic pseudo metal halide or an inorganic hydroxide.

A typical organic swelling agent may include any organic swelling agents disclosed in the art, see, e.g. as cited in The Polymer Handbook $3^{rd}$ edition, 1989 (published by J Wiley & Sons, edited by J Brandrup & E H Immergut), more specifically within the section "Properties of Cellulose Materials", specifically in the section "Solvents for Cellulose".

Suitable swelling agents for use in the present invention include but are not limited to (i) swelling agents, which are cellulose non-solvents which only swell the intercrystalline regions, such as morpholine, piperidine, and the like and (ii) swelling agents, which can swell both the intercrystalline and partially (but not fully) the intracrystalline regions.

Some of these latter swelling agents can under specific reaction conditions also act as cellulose solvents (which is not desired for the purpose of the present invention). Suitable swelling agents that can swell both the intercrystalline and partially (but not fully) the intracrystalline regions of the cellulosic materials could be alkali metal oxides, alkali metal hydroxides (e.g. potassium hydroxide, lithium hydroxide), alkaline earth metal oxides, alkaline earth metal hydroxides, alkali silicates, alkali aluminates, alkali carbonates, alkali thiocyanates, alkaline earth thiocyanates, alkali halides (e.g. chlorides, fluorides, bromides) amines, including aliphatic hydrocarbon amines, preferably lower aliphatic amines (e.g. trimethylamine, triethylamine), cupriethylenediamine, ammonia, ammonium hydroxide; tetramethyl ammonium hydroxide; trimethylbenzylammonium hydroxide; lithium chloride; tertiary amine oxides (e.g. N-methyl morpholine N-oxide), ionic liquids (e.g. 1-ethyl-3-methylimidazolium acetate), urea and mixtures thereof, zinc ammonium complex, zinc chloride, copper ammonium complex, silver ammonium complex, strontium hydroxide, barium hydroxide and the like, or mixtures thereof.

Suitable mixtures of swelling agents include a mixture of an organic swelling agent and an inorganic metal halide or pseudo metal halide, e.g. a mixture of sodium thiocyanate and ethylenediamine, Excluded from the scope of swelling agents for use in the present invention are any acid halides, e.g. hydrochloric acid, and conventional mineral acids, e.g. sulphuric, phosphoric and nitric acids.

In a preferred embodiment the swelling agent is a liquid organic swelling agent, preferably morpholine, piperidine or mixtures thereof. Preferably an aqueous mixture is used comprising >1% morpholine, piperidine or mixtures thereof (by volume), preferably >50% morpholine, piperidine or mixtures thereof, and most preferably at a ratio of from 80% morpholine, piperidine or mixtures thereof to 20% water to 90% morpholine, piperidine or mixtures thereof to 10% water.

In yet another embodiment the swelling agent is an aqueous mixture of morpholine, piperidine or mixtures thereof comprising of from 60 to 99% (by volume) morpholine, piperidine or mixtures thereof, or of from 70 to 95% (by volume) of morpholine, piperidine or mixtures thereof. In a further embodiment the liquid organic swelling agent is N-methyl morpholine N-oxide. Preferably, N-methyl morpholine N-oxide is used at a concentration of higher than 50%, preferably higher than 70%, but less than 81%, at temperatures of higher than 80° C., preferably higher than 85° C. Most preferred conditions for N-methyl morpholine N-oxide (NMMO) are at a concentration of 78% w/w and 85° C. Above these conditions (82% w/w and 85° C.) it behaves as a solvent for cellulosic material.

It is understood that a skilled person will know, that suitable reaction conditions, such as concentration of the swelling agent depends on the choice of swelling agent and its potential as a cellulose swelling agent. In particular when using a swelling agent which is also a recognised cellulose solvent, it is necessary to use it at below its dissolution concentration and temperature (which are known in the art, see e.g. The Polymer Handbook $3^{rd}$ edition, 1989 (published by J Wiley & Sons, edited by J Brandrup & E H Immergut), more specifically within the section "Properties of Cellulose Materials", specifically in the section "Solvents for Cellulose") such that it acts as a cellulose swelling agent, i.e. prior to the stage of full disruption of all intracrystalline bonding in the cellulosic material and its resultant dissolution.

Solvation should be preferably avoided, as complete disruption of the intracrystalline bonding will lead to destruction of the crystalline structure that is required as the product from the swelling process as disclosed herein.

The extent of swelling may be determined in various ways. In the context of the present invention, the extent of swelling has been found to be conveniently defined in terms of the apparent increase in the phase volume fraction of the cellulosic material in the system, relative to the phase volume fraction of the same cellulosic material suspended in water—the cellulose being in a powdered form amenable to processing via the intended mechanical technique.

In order to quantify the effectiveness of a given swelling agent, the cellulosic material in powdered form (1.0 g) was weighed into a 20 ml glass scintillation vial and the liquid swelling agent of interest (9.0 ml) added by means of a micropipetting device. The system was then mixed via manual agitation and allowed to equilibrate for 24 hours at 20° C. Alternatively, the extent of swelling may be determined following incubation at a temperature greater than ambient, as appropriate to the swelling agent of interest. In each case, an identical standard sample was also prepared using deionized water in place of the liquid swelling agent.

Taking the above definition of swelling, the cellulosic material is expected to not enter into a true solution of molecularly dispersed chains—rather to absorb a proportion of the fluid of the continuous phase, facilitated via disruption of intermolecular and intramolecular hydrogen bonding. The apparent phase volume fraction of the resultant swollen cellulose particles (and the associated interstitial fluid) is then estimated visually/macroscopically by means of a ruler with 1 mm graduations, with the heights of the upper (liquid supernatant, $h_{Upper}$) and lower (swollen cellulosic particles, $h_{Lower}$) phases being estimated to the nearest 0.01 mm. Use of a scintillation vial of cylindrical form (constant diameter/cross sectional area) conveniently allowed cellulose phase volume fractions, $v_{Cell}$, to be simply estimated from measured phase heights ($v_{Cell} \approx h_{Lower}/(h_{Upper}+h_{Lower})$). An apparent swelling index, S, is then defined by the ratio of volume fractions with and without the swelling agent (S=$v_{Cell}$ (swelling agent)/$v_{Cell}$ (water))

In the scope of the present invention, nanofibrillation of cellulosic materials via mechanical comminution processing means may be afforded in liquid media characterized by a swelling index, S, as defined above, of between 1 and 10, with a value between 1.5 and 3 being most preferred.

The practical determination of the swelling index, S, for Avicel PH-101 microcrystalline cellulose in morpholine:water mixtures of varying composition is presented in FIG. 1. Swelling increases to reach a maximum in systems where the volume fraction of morpholine in the continuous medium is between 80% and 90%. Alternatively, an aqueous mixture of morpholine and piperidine may be used, where the volume fraction of morpholine in the continuous medium may be kept below or equal to 78%, or from 60 to 78%, while the remaining volume fraction is made up of water and piperidine, thereby combining a safety advantage with dramatic energy reduction. Exemplary swelling agents are aqueous mixtures of morpholine and piperidine comprising, preferably consisting of, from 60 to 78% (by volume) of morpholine, of 1 to 39

(by volume) of piperidine, and at least 1% water, and more preferably aqueous mixtures of morpholine and piperidine comprising, preferably consisting of, from 70 to 78% (by volume) of morpholine, of 1 to 29 (by volume) of piperidine, and at least 1% water.

Other methods may be utilized to ascertain the degree of swelling, as will be known to those skilled in the art. For example, Fidale et al (2008), describe the gravimetric determination of the amount of liquid swelling agent absorbed as a means of quantification of the swelling of cellulose. Here, powdered cellulose was conditioned at constant relative humidity (~50%) prior to immersing in the swelling agent in a steel mesh thimble for a predetermined time. The swollen cellulose was then removed and excess liquid removed via centrifugation. Swelling of the cellulosic material was then expressed in terms of the mass of liquid absorbed.

Other methods of determining the extent of cellulose include swelling in, for example organic acids, has been determined by the retention of benzene (Richter et al., Ind. Eng. Chem., 1957, 49 (5), pp 907-912)

Mechanical comminution processing may be performed using conventional technologies known in the art, such as high shear forces, microfluidization, (e.g. a M110-EH Microfluidizer Processor fitted with two chambers in series), high pressure homogenization (e.g. a NanoDeBee high pressure homogenizer (BEE International Inc), a ConCor high pressure/high shear homogenizer (Primary Dispersions Ltd)), controlled hydro-dynamic cavitation (eg. using an Arisdyne Systems controlled flow cavitation device) and high friction forces (e.g. a Super MassColloider colloid/friction mill (Masuko)), and combinations thereof.

Apparatus of the type classified as a high pressure or high shear homogenizer, relies on the generation of high mechanical stresses within the fluid to achieve break down of the cellulosic feedstock into the desired nanocellulose. This is achieved by pumping the fluid formulation through a well-defined microfluidic interaction chamber—effectively a situation corresponding to a confined flow, as defined in the field of fluid dynamics.

The term "microfluidic", in the context of the present invention, refers to a confined flow geometry or interaction chamber, where the width orthogonal to the direction of flow is less than 500 microns, preferably between 400 and 50 microns. Commonly encountered interaction chamber designs include abrupt contractions (either axisymmetric or rectangular slots), Z-geometries (abrupt inflections in the path of the flow) and Y-geometries (where the flow is split and recombined as impinging/opposing jets). Each of the above interactions chamber designs are regarded as creating a complex flow, where the kinematics are such that both shear and tensile effects coexist (and thus it is not possible to define a single value of shear rate in complex flows of this type). This situation is clearly different to a so-called rheometrical flow—where the shear rate, shear stress and boundary conditions are well-defined, allowing material properties such as viscosity and first normal stress difference to be assigned a value characteristic of the fluid. Furthermore, geometries involving convergence of the streamlines/acceleration of the fluid (contractions, Z-geometries) or generation of a stagnation point (Y-geometry/opposing jets) are characterised by a high tensile or extensional component within the flow field—which makes a major contribution to the efficiency of mechanical fibrillation and dispersive mixing (but also further complicates defining a characteristic shear rate for the process).

The term 'high shear', in the context of use of a high shear homogenizer within the scope of the present invention, is best clarified via an illustrative example of the shear rate in a 50 micron radius (R) axisymmetric capillary (which may be considered as part of e.g. a Z-geometry used on an M110-EH Microfluidizer). A batch of MCC (5.0 g, Avicel PH-101) dispersed in 80:20 vol % morpholine:water (500 ml) was seen to pass through such a geometry in 2 minutes at a operating pressure (P) of 25000 psi. This corresponds to a volume flow rate (Q) of 4.16 ml min$^{-1}$ and thus a shear rate (assuming steady flow and making no allowance for shear thinning of the fluid) of $42.4 \times 10^6$ s$^{-1}$.

Shear rate ($\dot{\gamma}$) in capillary (Poiseuille) flow may be conveniently estimated via the following expression:

$$\dot{\gamma} = \frac{4Q}{\pi R^3}$$

Given that the flow in e.g. the M110-EH Microfluidizer is pulsatile in character, the true peak value of the shear rate in this part of the interaction geometry could be much higher. Thus for the purposes of the present invention the operating range of processing apparatus of the high shear homogenizer type is between $8.5 \times 10^6$ s$^{-1}$ and $102 \times 10^6$ s$^{-1}$ (defined as above) and 5000 psi to 60000 psi, most preferably between $34 \times 10^6$ s$^{-1}$ and $72 \times 10^6$ s$^{-1}$ (defined as above) and 20000 psi to 42500 psi.

An alternative technology that could be employed would be a colloid or friction mills. This technology relies on the generation of high shear rates between two coaxially mounted cone-shaped members separated by a narrow gap (the term narrow, in the context of the present invention would be defined by a distance of less than 500 microns). Typically, one member is fixed (stator) and the other rotated at high speed (rotor). Sections of the rotor and stator may have increasingly fine serrations or grooves, which aid fibrillation of the cellulosic feedstock. Taking the above defined rotor-stator configuration and an assumed gap of 50 microns, typical rotortip speeds of up to 50 ms$^{-1}$ are used. In rotor-stator mills, the apparent shear rate is conveniently estimated from the velocity gradient across the gap. In the above case, the apparent shear rate is therefore typically $1 \times 10^6$ s$^{-1}$.

The degree of disruption of the intercrystalline and the intracrystalline structure of the cellulosic materials can be determined using X-Ray diffraction or $^{13}$C NMR. It can be seen by these techniques that swelling agents that only affect the intercrystalline structure of the cellulosic materials retain all or most of their original, pre-swelling crystallinity. In the case of swelling agents that disrupt both intercrystalline and partially (but not fully) the intracrystalline bonding that the measured crystallinity of the cellulosic material will be reduced as a function of the extent of the degree of intracrystalline swelling induced by the agent used and by the processing conditions.

In the case of solid state $^{13}$C NMR spectroscopy, the relative proportions of amorphous and crystalline material is readily ascertained by consideration of the double peak corresponding to the resonance of the carbon nucleus at C4 (chemical shift typically 80-93 ppm), which is split into two components as the amorphous (80-87 ppm) and crystalline (87-93 ppm) regions correspond to different chemical environments. Loss of crystallinity post-swelling is manifested as a significant reduction in the area of the downfield peak of the C4 resonance signal, relative to the area of the upfield component.

In the case of wide angle x-ray diffraction (XRD), the fraction of crystalline cellulose is most simply estimated by comparison of the relative intensity of the peak corresponding to diffraction from the 002 plane in the cellulose I unit cell ($I_{002}$ taken at a Bragg angle 2θ of ~22.7° to the intensity ($I_{AM}$) measured at the trough between the 002 and 101 diffraction peaks (corresponding to diffraction from the less ordered amorphous regions). More complex analyses based on a full peak deconvolution of the diffractogram are available in e.g. Park et al—'Cellulose crystallinity index: measurement techniques and their impact on interpreting cellulase performance' (Biotechnology for Biofuels, 2010, 3, 10) and references cited therein.

At high levels of intracrystalline swelling the native cellulose polymorph, cellulose I is partially or fully converted to another polymorph when the swelling agent is removed from the cellulosic material. This is commonly encountered where alkali metal hydroxides (e.g. potassium hydroxide, sodium hydroxide) in aqueous media are employed as swelling agents. Here, the native cellulose, present in the natively occurring cellulose I polymorph is regenerated into the more thermodynamically stable (for use in the present invention less preferred) cellulose II polymorph—a process commonly referred to as 'Mercerisation' in the field of textile fibre science. The cellulose I and cellulose II polymorphs are readily distinguished by their characteristically different wide angle x-ray diffraction patterns. Both cellulose I and cellulose II are characterised by a monoclinic crystal habit, but differ in the relative directional orientation of adjacent polymer chains and pattern of associated intra- and intermolecular hydrogen bonding—the chains in cellulose I being parallel, whilst those in cellulose II are antiparallel.

FIGURES

FIG. 1: SEM of a typical Nanocellulose Product

Figure 3A:
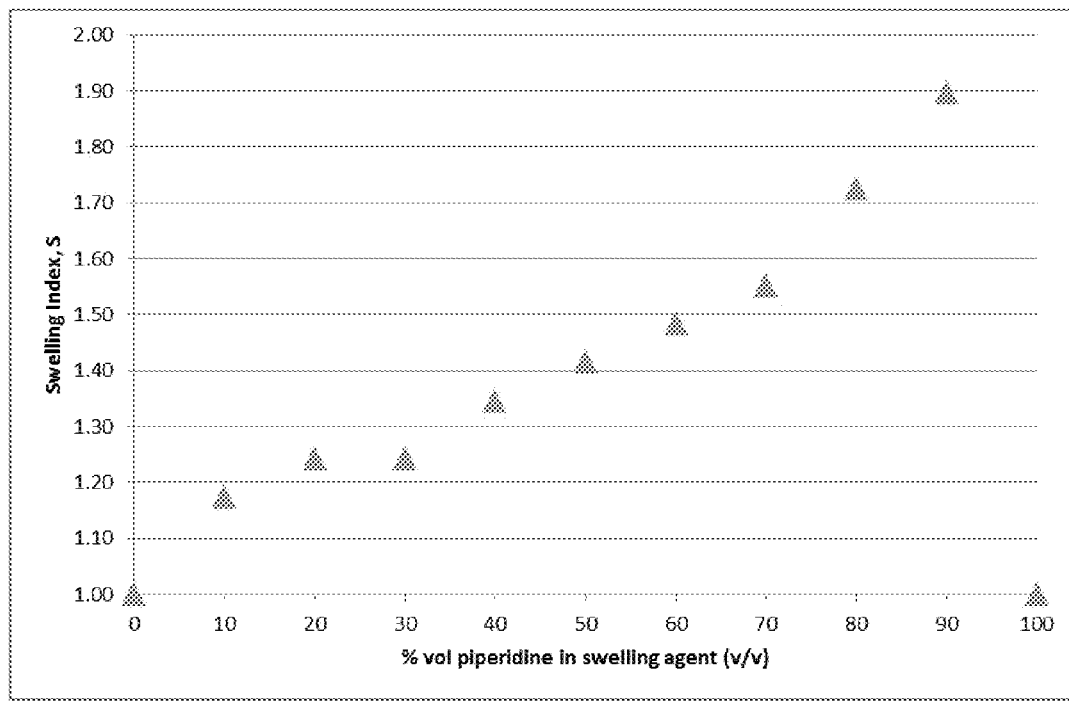
Figure 3:
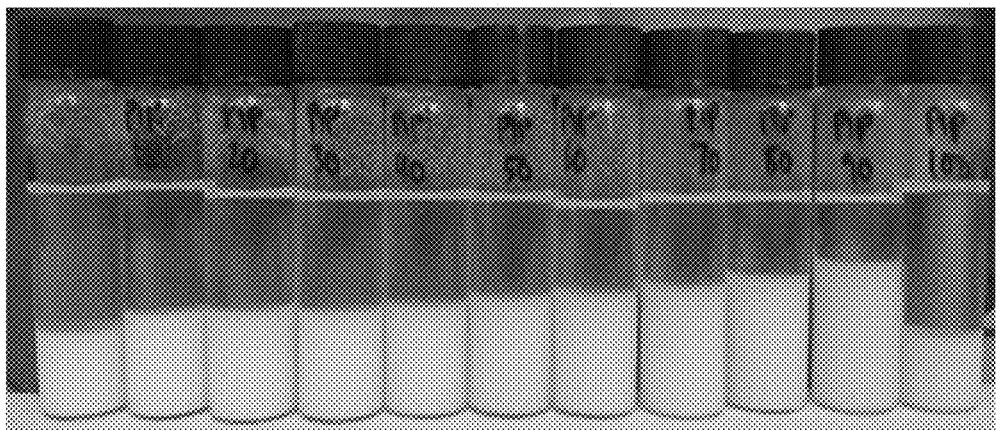

FIG. 2: (A) Quantification of the extent of swelling of microcrystalline cellulose (Avicel PH-101) in various water/morpholine mixtures (x-axis represents vol % morpholine in continuous medium (water); y-axis represents the swelling index S). (B): Image of samples used for generation of graph A, the numbers indicate % morpholine in water as the swelling agent. (C) Replicate quantification of the extent of swelling of microcrystalline cellulose (Avicel PH-101) in various water/morpholine mixtures (x-axis represents vol % morpholine in continuous medium (water); y-axis represents the swelling index S). (D): Image of samples used for generation of graph A, the numbers indicate % morpholine in water as the swelling agent FIG. 3: (A) Quantification of the extent of swelling of microcrystalline cellulose (Avicel PH-101) in various water/piperidine mixtures (x-axis represents vol % piperidine in continuous medium (water); y-axis represents the swelling index S). (B): Image of samples used for generation of graph A, the numbers indicate % piperidine in water as the swelling agent

DETAILED DISCLOSURE OF EMBODIMENTS OF THE INVENTION

Exemplary, non-limiting embodiments of the method of the invention are disclosed in the following paragraphs.

Methods:

The mechanical comminution processing has been performed here using a M110-EH Microfluidizer Processor fitted with two chambers in series. The first chamber is the Auxiliary processing Module (APM) and comprises a ceramic module with a 200 micron diameter channel and the second is called the Interaction chamber (IXC) and has a diamond channel with a 100 micron diameter channel. A range of channel geometries and channel sizes can be used with this equipment. The operational limits are not defined by this example.

EXAMPLES

Comparative Example 1

The processing of Saiccor 92% alpha pulp in water using a M110-EH Microfluidizer Processor, configured and described as above was used as a reference for energy usage. Water processing of this pulp used 25-28,000 kWh/t to create a nanocellulose product comparable with literature materials (see for comparison energy values of up to 70,000 kWh/t according to Siro I. and Plackett D., Cellulose (2010) 17, pp. 459-49 and energy values of 21,800 kWh/t according to Spence et al; Cellulose (2011) Vol 18, pp 1097-111 using a high shear homogeniser to generate microfibrillated cellulose having diameters of between 10-100 nm).

Example 1

Processing of Microcrystalline Cellulose in Aqueous Morpholine (Organic Swelling Agent)

Microcrystalline cellulose (Avicel PH-101, 5.0 g) was added to morpholine:water (80:20 vol %, 500 ml) by gradual introduction into the vortex created by a rotor:stator mixer (UltraTurrax), mixing being continued for a further 10 minutes at room temperature. This slurry was then introduced into the feed hopper of a M110-EH Microfluidizer (Microfluidics Corp) and recirculated for 8.5 minutes through two Z-shaped interaction chambers arranged in series [200 micron diameter (ceramic) followed by 100 micron diameter (diamond)], setting the operating pressure of the apparatus at 25000 psi. In a typical trial the energy used to generate a mixture of around 80% nanocellulose (defined as having an average diameter of less than 30 nm) equated to 1400 kWh/t. With an energy of <500 kWh/t a product is generated with approximately 45% of the material having average diameters less than 30 nm. Blockage of the interaction geometries in the early stages of the process was avoided by gentle mixing of the fluid in the feed hopper via a rotating impeller. During the process, the appearance of the system changed from white/opaque, through translucent to almost visually transparent, consistent with mechanical breakdown of the cellulose at a microstructural level. The rheology of the system changed from fluid to a soft gel-like solid. The resultant nanostructured cellulose was then separated from the swelling agent via centrifugation and the upper level of continuous phase removed via decantation. The system was then made up to its original volume by addition of an appropriate amount of deionized water and the system mixed thoroughly via manual agitation to afford re-suspension of the cellulose. Two more centrifugation, decantation, re-suspension operations were performed, prior to further purification of the system via dialysis against deionized water for 3 days (with frequent replacement of the dialysate). The cellulose was then isolated in solid form by means of freeze-drying. The morphology of the cellulose was conveniently characterized via scanning electron microscopy. Firstly a poly(vinyl alcohol) [PVOH] film was cast from a 10% aqueous solution on a glass microscope slide and allowed to dry under ambient conditions in a covered petri dish. A small aliquot of the dialysed cellulose suspension (~1 microliter) was then dispensed onto the PVOH and spread into a thin layer with the micropipette tip, before being allowed to dry. A small square (~3 mm×3 mm) of the PVOH was then cut from the polymer film and placed sample side down on an SEM stub covered with conducting tape. The PVOH layer was then removed via dissolution in hot deionized water and the exposed particles sputter coated with Au prior to imaging. Microscopy revealed that the polycrystalline aggregates present in the MCC had been broken down mechanically in the presence of the swelling agent into separate needle-like particles of aspect ratio in the range ~15-25 (length 400-700 nm, width 20-50 nm), which had a loosely aggregated structure.

Example 2

Processing of Cellulose Pulp in Aqueous Morpholine

Cellulose pulp (92% α-cellulose, viscose/dissolving grade from Sappi Saiccor) was shredded in a standard office paper shredder (cross-cut configuration). The shredded pulp (5.0 g) was then suspended in morpholine:water (80:20 vol %, 500 ml) and allowed to swell for 2 hours. The swollen pulp suspension was then homogenized using a rotor-stator mixer (UltraTurrax) and processed, purified and dried as in Example 1. SEM analysis as above indicated that the pulp fibres has been extensively broken down into an entangled web of fibres of diameter ~30 nm. Under these conditions, the generation of such a nanocellulose product required approximately 1500 kWh/t.

Example 3

Processing of Microcrystalline Cellulose in Aqueous Calcium Thiocyanate

Microcrystalline cellulose (Avicel PH-101, 5.0 g) was suspended in aqueous calcium thiocyanate solution (45% by weight, 500 ml) at 50° C. (corresponding to conditions which afford swelling as disclosed hereinabove) and the system homogenized using a rotor stator mixer. The hot cellulose slurry was then transferred into the feed hopper of an M110-EH Microfluidizer and processed, purified and dried as in Example 1.

SEM analysis as above indicated the mechanical breakdown of the microcrystalline cellulose in the presence of the swelling agent into separate needle-like particles of length 200-400 nm, although extensively aggregated.

Example 4

Processing of Cellulose Pulp in Aqueous Calcium Thiocyanate

Cellulose pulp (prepared as in Example 2, 5.0 g) was suspended in aqueous calcium thiocyanate solution (45% by weight, 500 ml) at 50° C. and allowed to swell for 1 hour. The pulp suspension was then homogenized by means of a rotor-stator mixer (UltraTurrax) for 10 minutes and the hot slurry introduced into the feed hopper of a M110-EH Microfluidiser (Microfluidics Corp). The cellulose slurry was then processed, purified and dried as in Example 1. SEM analysis indicated the mechanical breakdown of the pulp into extensively fibrillated and entangled structures of diameter <100 nm.

Example 5

Processing of Microcrystalline Cellulose in Aqueous Potassium Hydroxide

Microcrystalline cellulose (Avicel PH-101, 5.0 g) was suspended in aqueous potassium hydroxide solution (27% by weight, 500 ml) at 20° C. (corresponding to conditions which afford swelling as disclosed hereinabove) and the system homogenized using a rotor stator mixer. The hot cellulose slurry was then transferred into the feed hopper of an M110-EH Microfluidizer and processed, purified and dried as in Example 1. SEM analysis as above indicated the mechanical breakdown of the microcrystalline cellulose in the presence of the swelling agent into separate needle-like particles of length 200-400 nm, although extensively aggregated.

Example 6

Processing of Cellulose Pulp in Aqueous Potassium Hydroxide

Cellulose pulp (prepared as in Example 2, 5.0 g) was suspended in aqueous potassium hydroxide solution (27% by weight, 500 ml) at 20° C. and allowed to swell for 30 minutes. The pulp suspension was then homogenized by means of a rotor-stator mixer (UltraTurrax) for 10 minutes and the slurry introduced into the feed hopper of an M110-EH Microfluidiser (Microfluidics Corp). The cellulose slurry was then processed, purified and dried as in Example 1. SEM analysis indicated the mechanical breakdown of the pulp into extensively fibrillated and entangled structures of diameter <100 nm.

Example 7

Processing of Microcrystalline Cellulose in Aqueous N-Methylmorpholine-N-Oxide

Microcrystalline cellulose (Avicel PH-101, 5.0 g) was suspended in aqueous N-methylmorpholine-N-oxide [NMMO] solution (78% by weight, 500 ml—prepared by mixing appropriate amounts of NMMO monohydrate and water) at 85° C. (corresponding to conditions which afford swelling as disclosed hereinabove) and the system homogenized using a rotor stator mixer (UltraTurrax). The cellulose slurry was then transferred into the feed hopper of an M110-EH Microfluidizer (Microfluidics Corp) and processed, purified and dried as in Example 1. SEM analysis as above indicated the mechanical breakdown of the microcrystalline cellulose in the presence of the swelling agent into separate needle-like particles of length 200-400 nm, width 20-50 nm, which had a loosely aggregated structure.

Example 8

Processing of Cellulose Pulp in Aqueous N-Methylmorpholine-N-Oxide

Cellulose pulp (prepared as in Example 2, 5.0 g) was suspended in aqueous N-methylmorpholine-N-oxide solution (78% by weight, 500 ml—prepared by mixing appropriate amounts of NMMO monohydrate and deionized water) at 85° C. and allowed to swell for 1 hour. The pulp suspension was then homogenized by means of a rotor-stator mixer (UltraTurrax) for 10 minutes and the hot slurry introduced into the feed hopper of an M110-EH Microfluidiser (Microfluidics Corp). The cellulose slurry was then processed, purified and dried as in Example 1.

SEM analysis indicated the mechanical breakdown of the pulp into extensively fibrillated and entangled structures of diameter <100 nm.

Example 9

Processing of Cellulosic Fibre in Aqueous Morpholine

Cellulose technical textile fibre obtained from Cordenka GmbH under the trade name Cordenka 700 (Super 3) was chopped into approximately 3 mm lengths and then suspended in morpholine:water (80:20 vol %, 500 ml) and allowed to swell for 2 hours. The swollen fibre suspension was then homogenized using a rotor-stator mixer (UltraTurrax) and processed, purified and dried as in Example 1. SEM analysis as above indicated that the fibres had been extensively broken down into an entangled web of fibres of diameter ~30 nm. Under these conditions, the generation of such a nanocellulose product having substantially 90%≤30 nm required an energy input of typically <500 kWh/t.

Example 10

Processing of Cellulose Pulp in Aqueous Piperidine

Cellulose pulp (92% α-cellulose, viscose/dissolving grade from Sappi Saiccor) was shredded in a standard office paper shredder (cross-cut configuration). The shredded pulp (5.0 g) was then suspended in piperidine:water (90:10 vol %, 500 ml) and allowed to swell for 30 minutes.

The swollen fibre suspension was then homogenised using a rotor-stator mixer (UltraTurrax) at 4000 rpm for 10 minutes at room temperature and then further processed, purified and dried as described in Example 1.

SEM analysis as above indicated that the fibres had been extensively broken down into an entangled web of fibres of diameter ~3-30 nm. Under these conditions, the generation of a mixture of 80% nanocellulose product required approximately 1600 kWh/t.

The invention claimed is:

1. A low energy method for preparing a non-derivatised nanocellulose material comprising
   (a) treating a cellulosic material with a swelling agent to obtain swollen cellulosic material,
   (b) subjecting said swollen cellulosic material to effective mechanical comminution processing, and
   (c) isolating the nanocellulose material,
   wherein the swelling agent is a swelling agent disrupting intercrystalline regions only and
   wherein the cellulosic material is characterized by a swelling index of between 1.5 to 3 in said swelling agent and wherein the swelling agent is an aqueous solution of morpholine, piperidine or mixtures thereof comprising of from 70 to 99% (by volume) of morpholine, piperidine or mixtures thereof, respectively.

2. The low energy method according to claim 1 wherein the aqueous solutions of morpholine, piperidine or mixtures thereof comprise of from 70 to 95% (by volume) of morpholine, piperidine or mixtures thereof, respectively.

3. The low energy method according to claim 1 wherein the aqueous solutions of morpholine, piperidine or mixtures thereof comprise of from 80 to 90% (by volume) morpholine, piperidine or mixtures thereof.

4. The low energy method according to claim 1 wherein step (c) includes removal or neutralization of the swelling agent.

5. The low energy method according to claim 1 wherein the effective mechanical comminution processing of step (b) is achieved through high shear forces, high pressure homogenization, microfluidization, high friction forces, and combinations thereof.

* * * * *